United States Patent [19]

Hautemont

[11] 4,130,386

[45] Dec. 19, 1978

[54] DEVICE FOR PREFORMING AND HOLDING A WRAPPER IN A FORMING MOULD

[75] Inventor: Jean-Claude H. Hautemont, Gif-sur-Yvette, France

[73] Assignee: Societe Anonyme dite: Etude et Realisation de Chaines Automatiques Erca, Orsay, France

[21] Appl. No.: 842,630

[22] Filed: Oct. 17, 1977

[30] Foreign Application Priority Data

Oct. 26, 1976 [FR] France ............................. 76 32222

[51] Int. Cl.² ............................................. B29C 7/00
[52] U.S. Cl. ............................... 425/383; 425/398; 425/443; 425/444; 249/75; 249/136
[58] Field of Search ............... 425/383, 398, 443, 444, 425/422; 249/75, 136

[56] References Cited

U.S. PATENT DOCUMENTS

| 1,747,708 | 2/1930 | Haase | 249/75 |
|---|---|---|---|
| 3,807,682 | 4/1974 | Catinella et al. | 425/444 X |
| 3,865,533 | 2/1975 | Deprez et al. | 425/443 X |
| 3,986,805 | 10/1976 | Haines | 425/444 |

FOREIGN PATENT DOCUMENTS

53476  6/1945  France ........................ 249/75

Primary Examiner—Robert L. Spicer
Attorney, Agent, or Firm—Eyre, Mann, Lucas & Just

[57] ABSTRACT

The invention relates to a device for preforming and holding a wrapper in a forming mould constituting part of a forming station in a machine for heat-forming receptacles, said device comprising a plurality of applicator fingers movably mounted inside the forming chamber, the bottom wall comprising openings adapted to accommodate each finger, and further comprising finger controlling means which are arranged so as to ensure, on the one hand, the spaced-apart relationship of the fingers with respect to the side wall when the mould is in position of alignment with the wrapper-making device and, on the other hand, the application of said fingers against the side wall in all the other positions of the mould and during the displacement of said fingers along said side wall up to their housing in the bottom wall.

22 Claims, 10 Drawing Figures

DEVICE FOR PREFORMING AND HOLDING A WRAPPER IN A FORMING MOULD

The present invention relates to a device for preforming and holding a wrapper in a forming mould constituting part of a forming station in a machine for heat-forming receptacles such as goblets or the like made of thermoplastics material, in which machine are provided at least one mould of which the forming chamber is arranged in a mould body and comprises a cylindrical or truncated side wall, a bottom wall which is fixed with respect to said side wall and a mould opening opposite said mould bottom, as well as a wrapper-making device adapted to place a wrapper in said forming chamber before a receptacle is heat-formed, the mould being movably mounted between a forming position and a stripping position and being adapted to be aligned with said wrapper-making device for the introduction of a wrapper in said forming chamber. Wrapper-making devices are known, for example, from German Gebrauchsmuster No. 1 969 306 and French Pat. No. 70 09142. The wrappers placed in the forming chamber by the wrapper-making device do not perfectly assume the shape of the inner periphery of the forming chamber, particularly when said latter has wall portions whose radii of curvature are fairly small and alternate with wall portions whose radii of curvature are relatively large, infinite or reversed.

It is an object of the present invention to eliminate the above-mentioned drawbacks and to propose a device for preforming and holding a wrapper, whereby the wrapper exactly fits all the shapes of the contour of the inner wall of the forming chamber.

In accordance with the present invention, this purpose is attained in that the device for preforming and holding a wrapper comprises a plurality of applicator fingers movably mounted inside the forming chamber with respect to the side wall of the forming chamber in radial planes of said chamber and both parallel and transversely with respect to said side wall, the bottom wall of the forming chamber comprising openings for accommodating each finger which is adapted to be concealed in said opening and further comprises means for controlling said applicator fingers, said means being arranged so as to ensure, on the one hand, the spaced-apart relationship of the applicator fingers with respect to the side wall of the forming chamber when the mould is in position of alignment with the wrapper-making device and, on the other hand, the application of said fingers against the side wall in all the other positions of the mould and during the displacement of said fingers along said side wall until they are concealed in the housings in the bottom wall.

Due to this arrangement, it is possible to insert a wrapper in the forming chamber through the opening of the mould and to apply said wrapper against the side wall of the forming chamber, whilst preforming said wrapper, particularly in those wall portions of the forming chamber which have a very small radius of curvature. It should also be noted that the design according to the invention enables wrappers to be shaped which are subsequently to take a cylindrical form as well as those which are to take a truncated or pyramidal form, as soon as the receptacle is formed.

The control means comprise for each applicator finger a bent lever having at least two arms, the pivot axis of which is perpendicular to the plane of pivoting of the corresponding applicator finger and mounted on a support sliding parallel to the axis of the forming chamber below the bottom wall of said forming chamber, one of said arms bearing at its free end the applicator finger and passing through corresponding opening made in the bottom wall. The means for controlling the applicator fingers also comprise a return spring mounted on the sliding support and acting on the other arm of the bent lever, i.e. the lever arm which does not bear the corresponding applicator finger, so as to urge the applicator finger against the side wall of the forming chamber. In addition these control means further comprise a spacer stop adapted to cooperate with one of the arms of the bent lever at the end of forward stroke of the sliding support, i.e. the stroke for introduction of the applicator fingers inside the forming chamber, so as to separate the corresponding applicator finger from the side wall of said forming chamber. It will be readily understood that, in end of forward stroke position, i.e. when the applicator fingers are separated from the side wall of the forming chamber and brought near one another towards the axis of the forming chamber, a wrapper may be introduced through the opening of the mould without it meeting any obstacle along the side wall of said forming chamber.

As soon as the introduction of the wrapper in the forming chamber has terminated, the applicator fingers are made to return towards the side wall of said forming chamber and are made to descend, at the desired moment, towards their housing whilst being maintained applied against said side wall. In this way, the wrapper is preformed and strongly applied against the side wall of the forming chamber, particularly at those spots where the forming chamber has wall portions with very small radii of curvature, on condition that the applicator fingers are located opposite these wall portions of very small radii of curvature.

According to another feature of the invention, the sliding support on which are pivoted the bent levers of the applicator fingers is connected, preferably over a large part of its descending or return stroke, to an element which is fast, directly or indirectly, with the forming punch. Due to this design, it is possible to hold the wrapper with the applicator fingers during the forming of the receptacle, i.e. whilst the sheet of thermoplastics material which subsequently constitutes the receptacle is being moulded on the wrapper. As the applicator fingers descend towards the bottom wall of the forming chamber, i.e. as the applicator fingers preform the wrapper and release its upper part, said latter is taken by the thermoplastics sheet and is applied thereby against the inner wall of the forming chamber. In this way, the wrapper is held in place not only by the applicator fingers but also by a part of the thermoplastics sheet which is being heat-formed with a view to obtaining a receptacle.

The invention will be more readily understood on reading the following description with reference to the accompanying drawings, in which.

Referring now to the drawings, the Figures show that the wrapper preforming and holding device is associated with at least one forming mould 1 which constitutes part of a forming station (not shown) of a machine for heat-forming receptacles as described for example in French Pat. No. 70 091 42. In the mould body 2 is arranged a forming chamber 3 which comprises, in the case illustrated in this Figure, a cylindrical side wall 4 inscribed in a square. Of course, the side wall may also be truncated and its transverse section may also be inscribed in a rectangle or other polygon. The forming chamber 3 is delimited at its lower end by a bottom wall 5 perpendicular to the axis of said chamber 3 and fixed with respect to the side wall 4 of this chamber 3. Opposite the bottom wall 5, the forming chamber 3 is accessible through the mould opening 6 whose periphery merges with that of the side wall 4. It is through this mould opening 6 that the wrappers are introduced into the forming chamber when said forming chamber 3 is in position of alignment with the corresponding winding chamber of a wrapper-making device. The design of a wrapper-making device will not be described in detail since embodiments thereof are already known by German Gebrauchsmuster No. 1 969 306 and French Pat. No. 70 091 42. Opposite those portions of side wall 4a which have a small radius of curvature, the bottom plate 5 comprises openings 7 for accommodating the applicator fingers 8 of the preforming and holding device. These housings 7 extend, in the case illustrated, parallel to diagonal planes of the forming chamber 3 as far as the side wall 4 of said chamber 3.

The applicator fingers 8 are mounted on a bent lever 9 which comprises at least two arms preferably forming an obtuse angle therebetween. The bent lever 9 is pivotally mounted on a horizontal pivot 10 which is perpendicular to the plane of pivoting of the applicator finger 8 and which is mounted on a support or slide 11 mounted to slide parallel to the axis of the forming chamber 3. As may be seen in FIG. 2, the support or slide 11 is disposed in a chamber 12 provided below the bottom wall 5 in the mould body 1. The arm 9a of the bent lever 9 which bears the applicator finger 8, passes through the opening 7 arranged in the bottom wall 5. The second arm 9b of the bent lever 9 is directed towards the inside of the chamber 12 and cooperates for example with a return spring 13 mounted on the sliding support 11 and acting on said second arm 9b so as permanently to urge the corresponding applicator finger 8 against the side wall 4 of the forming chamber 3.

Figure 1:
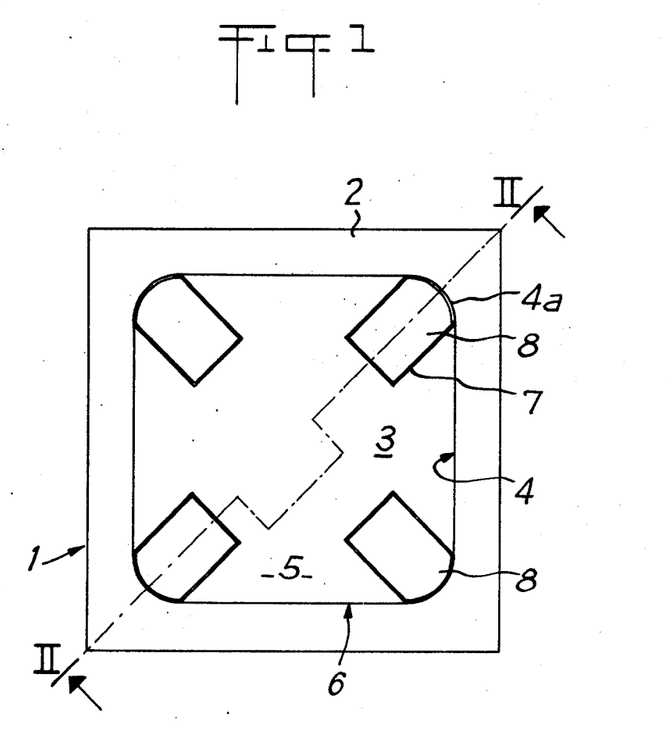
FIG. 1 is a plan view of a mould provided with the device according to the invention for preforming and holding a wrapper in place.
Figure 2:
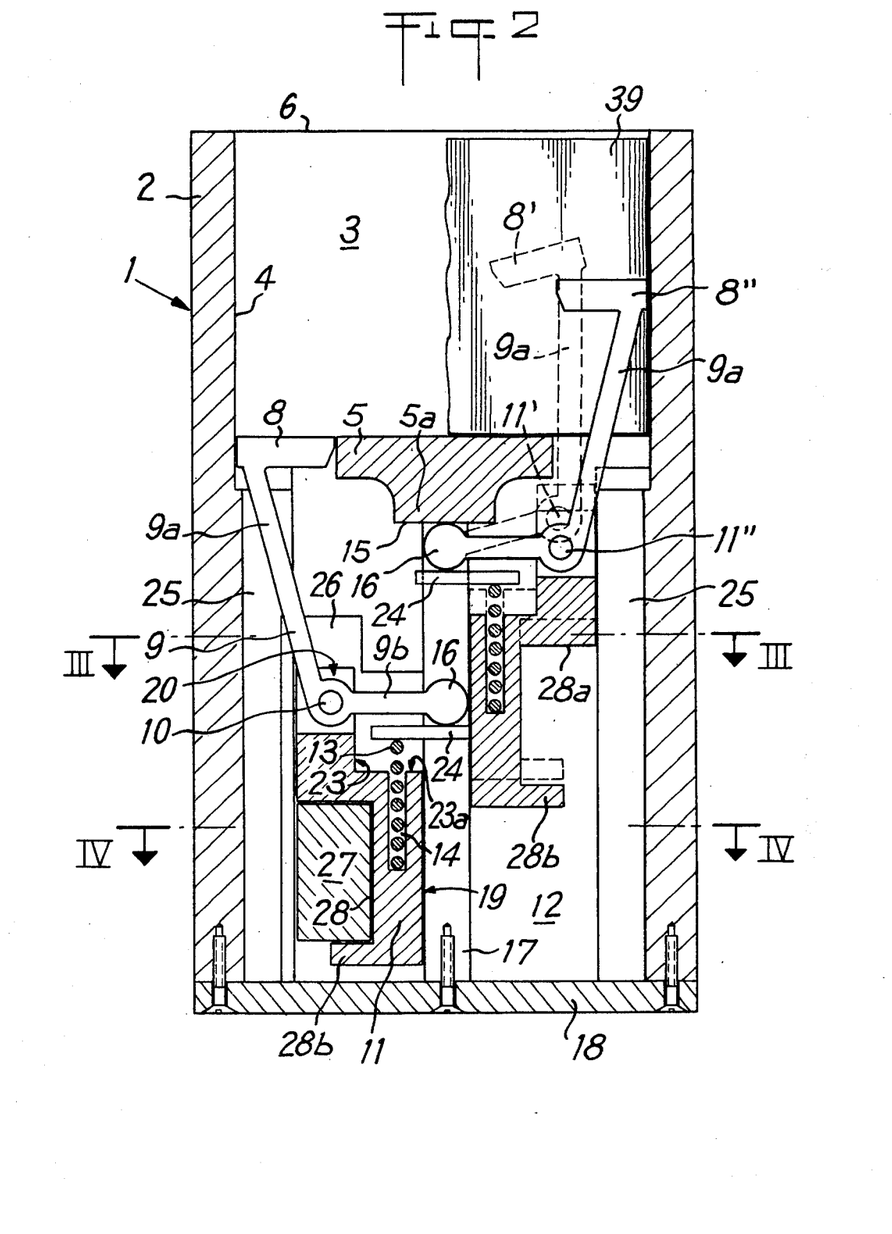
FIG. 2 is a view in elevation of a vertical section along a diagonal plane of FIG. 1, said vertical, substantially diagonal plane applied by the broken lines of FIGS. 1, 3 and 4.

Of course, the second arm 9b of the bent lever 9 could also be directed outwardly and downwardly from the pivot 10 and be returned towards the central part of the chamber 12 by means of a draw spring fixed, on the one hand, to said second arm 9b and, on the other hand, to the sliding support 11 so that the corresponding applicator finger 8 is permanently urged against the side wall 4 of the forming chamber 3.

Figure 8:
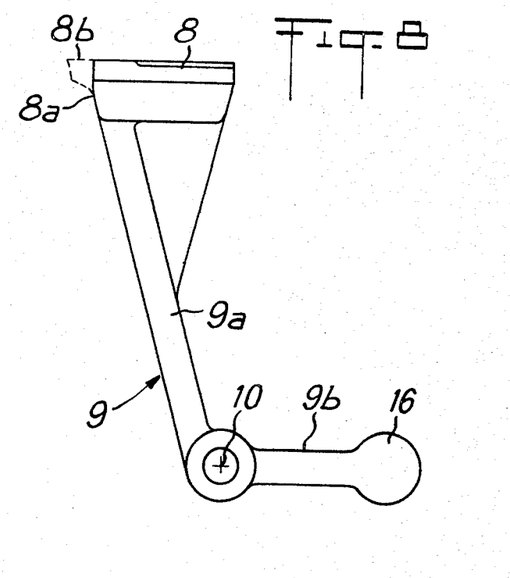
Figure 9:
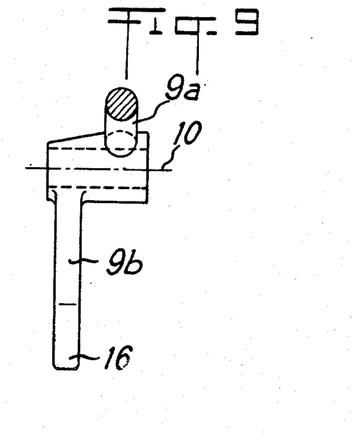
Figure 10:
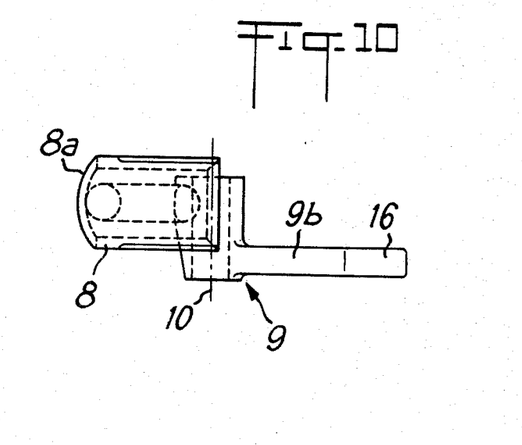

The arm 9a of the bent lever 9 which bears the applicator finger 8, is preferably fixed to this latter in the zone of its outer radial end with respect to the axis of the forming chamber 3. In other words, the fixing of the applicator finger 8 on the lever arm 9a is preferably effected in that zone of the finger 8 which is intended to come into contact with the side wall 4 of the forming chamber 3. As shown in FIGS. 8 and 10, the front face 8a of the applicator finger 8 is vertical, i.e. parallel to the axis of the forming chamber and to the cylindrical side wall 4 of said forming chamber 3. However, when the forming chamber has a side wall which is truncated or pyramidal, the front wall of the applicator finger 8 is provided with a projecting nose 8b (cf. the nose shown in dotted lines in FIG. 8) and is inclined so as to be adapted to the inclination of the truncated or pyramidal side wall of the forming chamber 3. FIGS. 2 and 7 to 10 also show that the arm 9a of the bent lever 9, which upper arm 9a bears the applicator finger 8, is downwardly inclined inwardly of the mould so that the pivot 10 is plumb with the rear end of the applicator finger 8. Due to this design, the upper arm 9a of the bent lever has a sufficient freedom of clearance when the applicator finger 8 is introduced inside the forming chamber 3. FIGS. 2 and 7 to 10 also show that the two arms 9a, 9b of the bent lever 9 are offset laterally with respect to each other in the direction of the pivot axis 10 of the lever. Consequently, the second lever arm may be long and extend as far as a radial plane of the forming chamber 3, which radial plane is parallel to the pivot axis 10 of the corresponding lever 9.

In the case shown in FIG. 2, the second arm 9b of the bent lever 9 cooperates with the return spring 13 partially housed in an annular chamber 14 of the sliding support 11, via a control washer which rests on the upper end of the return spring 13 and which bears the free ends of all the second arms 9b of the bent levers 9.

The means for controlling the applicator fingers 8 also comprise a spacer stop 15 which is adapted to cooperate with the free end of the second lever arm 9b at the end of forward stroke, i.e. ascending in the direction of the mould opening 6, of the sliding support 11, so as to separate the corresponding applicator finger 8 from the side wall 4 of the forming chamber 3, by preventing the advance of the free end of the second arm 9b and thus by compressing the return spring 13.

According to the embodiment shown in FIG. 2, the spacer stop 15 adapted to cooperate with the second arm 9b of the bent lever 9 is constituted by a protuberant element 5a in the bottom wall 5 of the forming chamber 3. This protuberance 5a projects in the direction of the sliding support 11 and comprises a stop face parallel to the bottom of the forming chamber 3. It is this stop face which constitutes, in the example illustrated, the spacer stop 15.

With a view to facilitating the cooperation between the rear end of the second lever arm 9b and the spacer stop 15, the free end of the second arm 9b is provided with a counter-stop 16 which is in the form of a disc whose periphery passes beyond the top and bottom of that of the second arm 9b.

According to a variant embodiment, the bent lever 9 may be made with three arms, the first arm of which occupies a position similar to that of the first arm 9a of FIG. 2 and is provided with the applicator finger 8, the second arm is directed outwardly and downwardly from the pivotal axis and cooperates, by its free end, with a draw spring fixed by its other end to the central part of the sliding support 11, and the third arm of which is preferably directed horizontally, inwardly from the pivotal axis 10 and is designed as counter-stop adapted to cooperate with the spacer stop 15 against the action of the return spring at the end of forward stroke of the sliding support 11.

The forward stroke and the return stroke of the sliding support may be controlled in several ways. When a control of the pneumatic type is provided, the sliding support or at least part thereof is made as piston. It has proved that, in certain cases, a mechanical control of the sliding support 11 is preferable. In any case, the sliding support 11 is guided parallel to the axis of the forming chamber 3. This guiding may be effected along the side wall of the chamber 12 arranged below the bottom wall 5 in the mould body 1. However, this guiding may also be made by means of a guide rod 17 which is disposed coaxially with respect to the axis of the forming chamber 3 below the bottom wall 5 and which is made fast with the mould body 2 by means of a lower fixing plate 18 and with the bottom wall 5 to which said rod is also fixed. For its guiding, the sliding support 11 comprises a central guide bore 19 through which passes the guide rod 17. It should be noted that the return spring 13 may be designed with such a return force that the friction forces produced thereby at the location of the applicator fingers 8 between said latter and the side wall 4 of the forming chamber are sufficient to maintain the sliding support 11 immobile when no outside control force is exerted thereon.

Figures 3, 4:
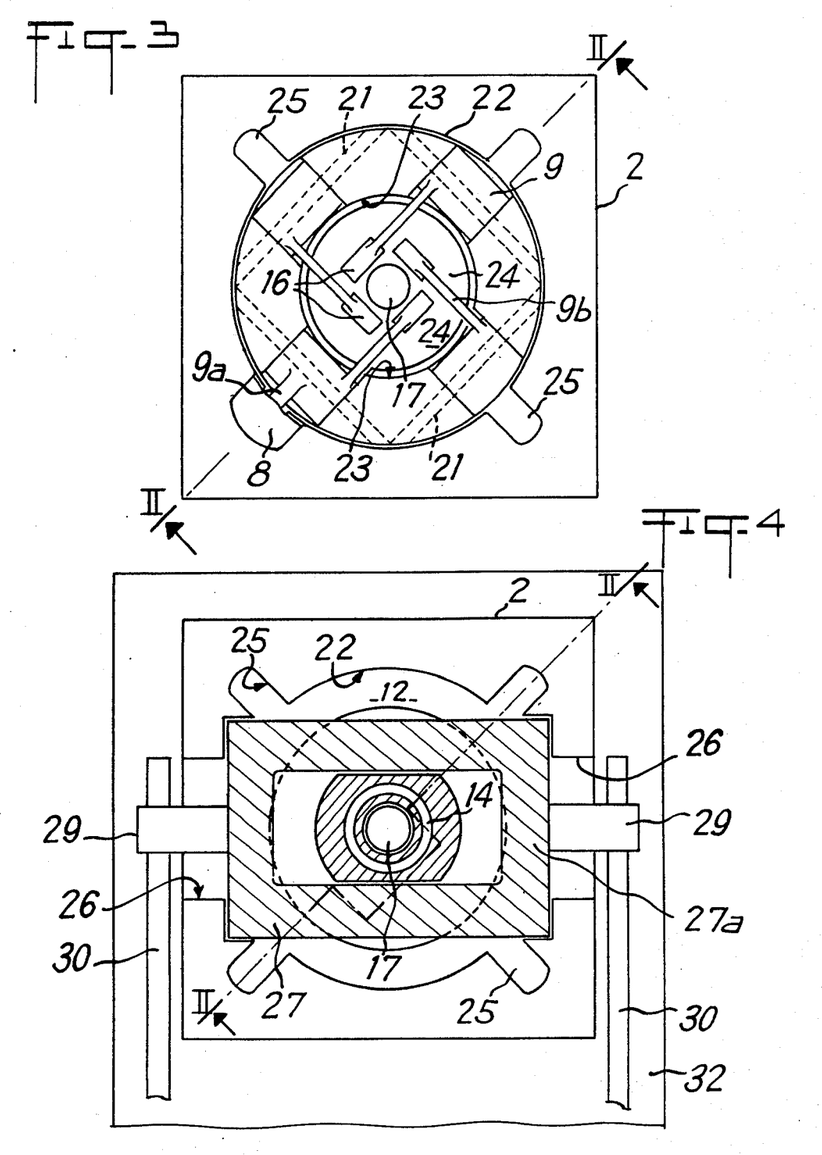
FIG. 3 is a plan view of a horizontal section through the preforming and holding device, along line III—III of FIG. 2.
FIG. 4 is a plan view of a horizontal section through the preforming and holding device along line IV—IV which is located at a level lower than that of the horizontal line of section III—III.

At its upper end, the sliding support 11 comprises a certain number of housing notches 20 in which are placed the bent portions of the bent lever 9. The side walls of the housing notches 20 are provided with horizontal bores 21, enabling the pivots 10 for the bent lever 9 to be inserted laterally. As may be seen more particularly in FIG. 3, the periphery of the upper part of the sliding support 11 is circular in form and the chamber 12 also comprises, in this case, cylindrical walls 22. The sliding support 11 comprises a central recess 23 made from its upper front face in said support 11 to a sufficient depth, so that the bottom 23a of this central recess 23 is well below the level of the pivots 10 of the bent lever 9. It is this central recess 23 which is penetrated by the upper end of the return spring 13 housed in the annular chamber 14 made from the bottom 23a in the body of the sliding support 11. It is also in this central recess 23 where the control washer 24 interposed between the spring 13 and the second arm 9b of the bent levers 9 is housed. FIGS. 2 to 4 also show that, at the location of the first arms 9a of the bent levers 9, the chamber 12 provided below the bottom wall 5 is radially enlarged by vertical radial grooves 25 to allow passage of the upper arms 9a of the levers 9. In addition, the chamber 12 communicates with the outside over about two thirds of its height from the bottom via side passages 26, the use of which will be explained hereinafter.

The sliding support 11, when it is controlled mechanically, is preferably associated with a control bar 27 which, in the case shown, is in the form of a stirrup and is housed in outside side recesses 28 of the sliding support. The control bar 27 is imprisoned in this housing recess 28 between the side shoulders or side flanges 28a and 28b of the sliding support 11. In this way, the sliding support 11 is made fast with the control bar 27 which, when it cooperates with actuating means provided outside the forming mould 1, transmits its movement to the sliding support 11. The control bar 27 comprises on the transverse arms 27a a control stud or roller 29 which extends to the outside of the mould 1, passing through the corresponding opening 26.

It is by means of this control stud or roller that the actuation means act on the control bar 27 and thus cause the sliding support 11 to move.

These actuation means generally comprise at least one guide ramp intended to cooperate with the control stud or roller 29 and provided on the path of the mould 1 between its position of stripping and its position of alignment with the device for making wrappers (not shown). This guide ramp comprises two guide sections, the first of which is associated with the "outward" path of the control stud or roller, said path extending from the position of stripping to the position of alignment with the wrapper-making device, and its shape is such that said stud and thus the control bar 27, the sliding support 11 and the applicator fingers 8 are displaced from a first lower extreme position corresponding to the concealment of the applicator fingers 8 in the housing 7 of the bottom wall 5, to the second extreme position in which the applicator fingers 8 are most inserted in the forming chamber 3 and closest to the opening 6 of said chamber 3, and separated from the side wall 4 of said chamber. On the other hand, the second section of the guide ramp is associated with the return path of the control stud or roller 29 and its shape is such that the applicator fingers 8 and thus the sliding support 11 and the control bar 27 are displaced from the second extreme position to a first intermediate position in which the applicator fingers 8 coming from said second extreme position abut against the side wall 4 of the forming chamber either directly or via a wrapper which has just been introduced into said chamber 3.

Figure 5:
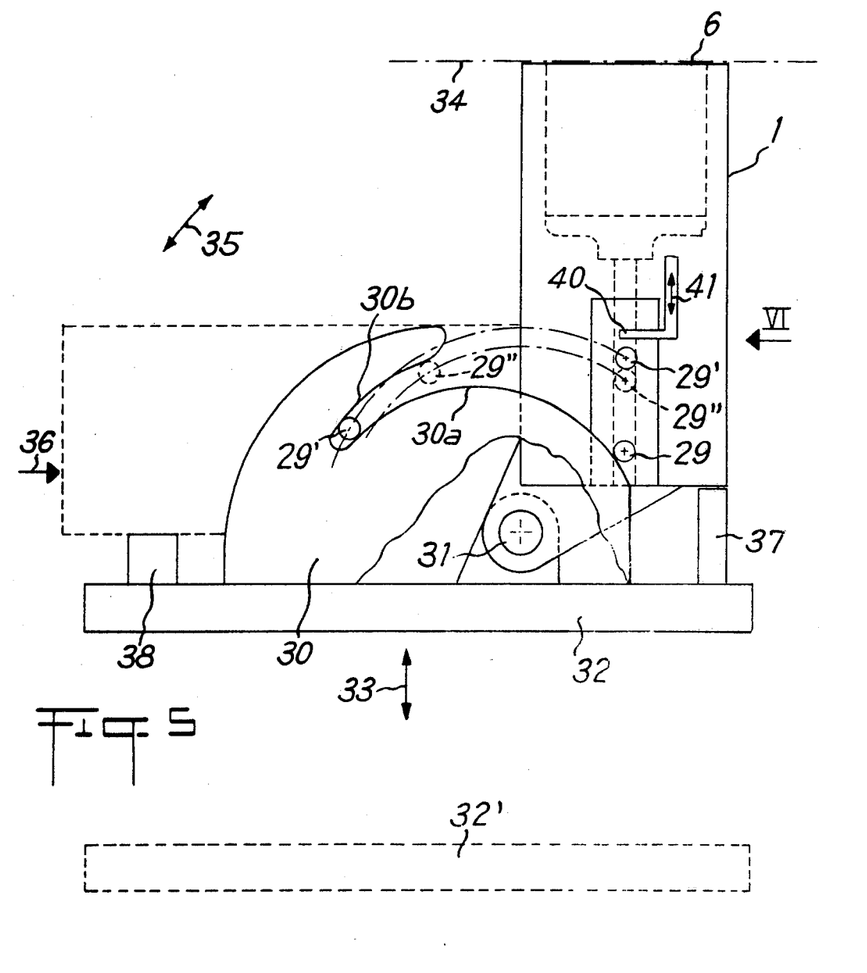
FIG. 5 is a side view in elevation of a mould pivotally mounted on a press plate, and of a few elements forming part of the preforming and holding device according to the invention.
Figure 6:
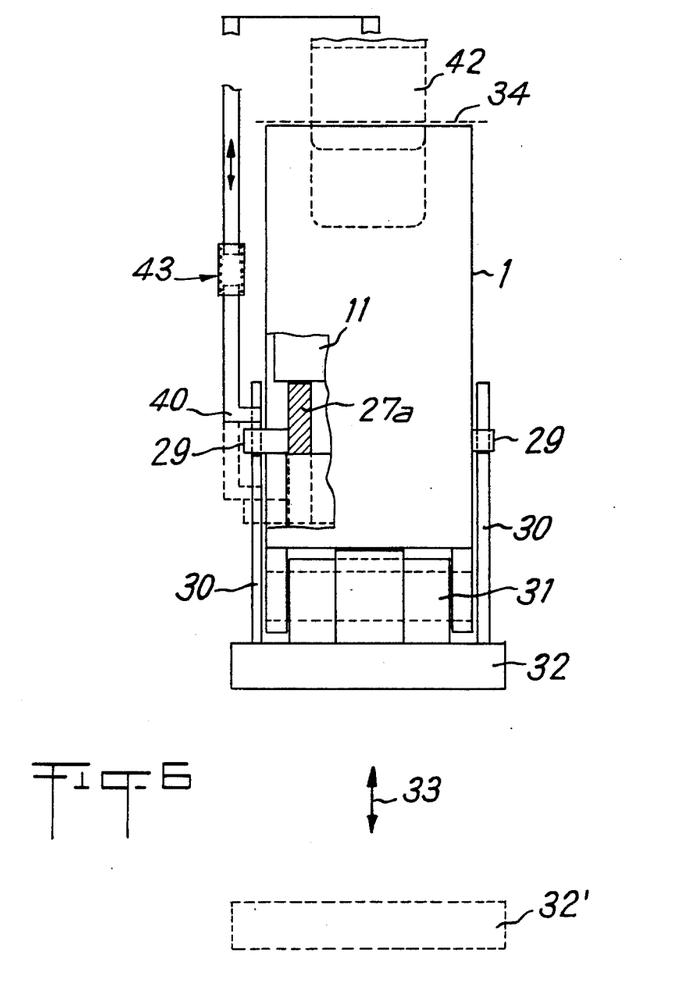
FIG. 6 is a front elevation view of the mould in the direction of arrow VI of FIG. 5, and FIGS. 7 to 10 are views in elevation and in plan of an embodiment of an applicator finger used in the preforming and holding device according to the invention.
Figure 7:
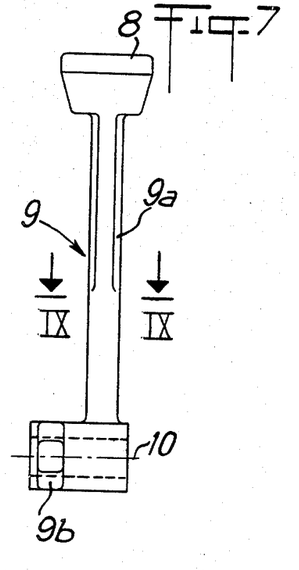

According to the embodiment shown in FIGS. 4 to 6, two parallel guide ramps 30 are provided which are associated with a mould 1 adapted to pivot about a horizontal axis 31 between a vertical position and a horizontal position (indicated in broken lines in FIG. 5). The pivot axis 31 of the mould 1 is provided in this particular case on a press plate 32 which is vertically movable in the direction of arrow 3 between a high, so-called forming position, in which the opening 6 of the mould 1 is just below the plane of transport of the thermoplastics sheet 34 and a low, so-called stripping position (indicated in broken lines and by reference 32'). It is in this stripping position that the mould is pivoted from the vertical position to the horizontal position in the direction of arrow 35, so that, in horizontal position, a wrapper may be inserted in mould 1 through its opening 6, as is schematically indicated by arrow 36. Of course, the press plate comprises two stops 37, 38 which exactly determine the vertical and horizontal positions of the mould 1. As may be seen in FIG. 6, the mould 1 is associated with two guide ramps 30 disposed on either side of said mould 1. Of course, the present invention is not limited to one mould only, but, on the contrary, may be applied to a series of juxtaposed moulds whose axes determine a transverse plane perpendicular to the direction of advance of the thermoplastics sheet 34. In this case, the control bars 27 extend transversely through the mould body of all the moulds 1 and it is only at the ends of these bars 27 that their transverse arms 27a are provided with control studs or rollers 29.

As may be seen more particularly in FIG. 5, the first guide section 30a of the guide ramp 30 is of such shape that the control stud 29, being in its lower extreme position for which the applicator fingers 8 are concealed in the housing in the bottom wall 5, is forced to pass from said lower extreme position to the upper extreme position 29' when the mould 1 pivots through 90°, for which upper extreme position the applicator fingers 8 are separated from the side wall 4 of the forming chamber 3 (cf. right-hand part of FIG. 2, applicator fingers indicated by reference 8'). It is in this upper extreme position that the applicator fingers 8 or 8' are close to one another towards the central part of the forming chamber 3 and in which the upper arms 9a of the bent levers 9 are approximately vertical and in no wise prevent the insertion of a wrapper 39 in the forming chamber 3 (cf. FIG. 2).

The second guide section 30b of the guide ramp 30 is shaped so that during the return path of the mould 1 from the position of alignment with the wrapper-making device, i.e. in the present case from the horizontal position to the vertical position, the control roller or stud 29 is displaced from the upper extreme position to a first intermediate position (cf. FIG. 5, reference 29") in which the applicator fingers 8 coming from the second extreme position (cf. reference 8' in FIG. 2) abut again against the side wall 4 of the forming chamber 3 via the wrapper 39, urging said latter against said side wall 4 (cf. the applicator finger indicated in FIG. 2 by reference 8"). It is from this first intermediate position that the applicator fingers remain in contact with the wrapper 39, applying it against the side wall 4 of the forming chamber for the whole return stroke of the sliding support 11 until the applicator fingers have returned into the lower position in which they are concealed in the housings provided to this end in the bottom wall 5.

FIG. 2 shows three essential, different positions of the applicator fingers 8. On the left-hand side of FIG. 2 is shown the lower extreme position of the applicator fingers 8, in which they are concealed in the housing of the bottom wall 5. Of course, all the other elements such as sliding supports 11, control bars 27, return springs 13, etc. occupy the corresponding positions. On the right-hand side of FIG. 2 are shown two positions, the one in light broken lines corresponding to the second high extreme position of the applicator fingers and the other showing the elements with hatching corresponding to the first intermediate position in which the applicator fingers penetrate most in the forming chamber 3 but remain applied against the side wall 4 thereof. During the ascending advance stroke of the slide 11, the counter-stop 16 of the second arm 9b of the bent lever 9 bears against the spacer stop 15 (cf. right-hand part of FIG. 2 for which the applicator finger 8" is still in contact with the side wall 4 of the forming chamber 3). Of course, the counter-stop 16 in contact with the spacer stop 15 should in fact be located behind the guide rod 17, but to clarify the drawing, it has been indicated in front of the guide rod 17. When the support 11 continues its ascending stroke after the counter-stop 16 has come to bear against the spacer stop 15, it is only the pivot 11' which continues the ascending movement to pass from position 11" to position 11' corresponding to the upper extreme position. Consequently, the upper arm 9a of the bent lever 9 is pivoted towards the inside of the forming chamber 3 and the applicator fingers 8 are separated from the side wall 4 and move towards the centre of said forming chamber (cf. position 8' of the applicator fingers). Of course, the last part of the ascending stroke of the sliding support 11 is possible only due to the supplementary compression of the return spring 13 and the penetration of the control washer 24 in the central recess 23 of the sliding support 11.

The return of the applicator fingers from the upper end position to the first intermediate position (cf. reference 8" of FIG. 2) is ensured by the second guide section 30b of the guide ramp. The supplementary return stroke of the sliding support 11 towards the lower extreme position in which the applicator fingers 8 are concealed in the housings of the bottom wall 5 may be effected by any suitable actuation means. To this end, there is provided a return member 40 which is adapted to act on the control stud or roller 29 from its first intermediate position when the mould 1 is in vertical position and preferably in forming position. This return member is mounted to move vertically in the direction of arrow 41 and is capable of returning the stud and thus the applicator fingers 8 in the first extreme position corresponding to the concealment of the fingers 8 in the bottom wall 5 of the forming chamber 3. The return member 40 is advantageously connected to the forming punch 42 so that the applicator fingers 8 and the control stud 29 are lowered as the forming punch 42 penetrates the forming chamber 3 and deforms the thermoplastics sheet 34 which grips the wrapper 39 located inside said forming chamber 3 from behind. Thus the wrapper is constantly maintained applied against the side wall 4 even during the actual forming operation. In addition, as the applicator fingers 8 execute a small descending stroke before the wrapper is gripped by the thermoplastics sheet from which the receptacle is made, the wrapper is always correctly positioned, even when it had not been during its introduction in the forming chamber.

Of course, different embodiments may undergo modifications without departing from the scope of the present invention.

For example, a two-armed lever may also be used, whose arms are substantially aligned with respect to each other. In this case, it is preferable that the lower arm be urged towards the axis of the forming chamber by a return spring abutting on the periphery of the sliding support. In this case, a cam is provided as spacer stop for each lower arm of the lever, which cam is disposed on the guide rod, near the bottom wall of the forming chamber and which is located in the same radial plane as the corresponding lever. Thus, when the support of the slide arrives in the end of ascending stroke zone, the cam acts on the lower arm of the lever and thus separates the corresponding applicator finger from the side wall of the forming chamber.

It is also advantageous to provide a telescopic connection 43 in the connection between the return 40 and the forming punch 42 (cf. FIG. 6). This telescopic connection 43 is arranged so that the return member 40 and the applicator fingers 8 may be disconnected from the forming punch 42 when said fingers abut against an obstacle at the end of their descending return stroke. In this way, when the applicator fingers 8 have entered their housings provided in the bottom wall 5, and are thus stopped, the forming punch 42 may still continue its descending stroke towards said bottom wall 5 without being hindered by the prior stopping of the applicator fingers in their concealed position.

I claim:

1. In a machine for heat-forming receptacles such as goblets made of thermoplastics material, in which are provided at least one mould whose forming chamber is arranged in a mould body and comprises a cylindrical or truncated side wall, a bottom wall which is fixed with respect to said side wall and a mould opening opposite said mould bottom, as well as a wrapper-making device adapted to place a wrapper in said forming chamber before a receptacle is heat-formed, the mould being mounted to move between a position of forming and a position of stripping and being adapted to be aligned with said wrapper-making device for the introduction of a wrapper in said forming chamber, a device for preforming and holding the wrapper in said mould, comprising a plurality of applicator fingers movably mounted inside the forming chamber with respect to the side wall of the forming chamber in radial planes of said chamber and both parallel and transversely with respect to said side wall, the bottom wall of the forming chamber comprising openings for accommodating each finger which is adapted to be concealed in said opening, and further comprising means for controlling said applicator fingers, arranged so as to ensure, on the one hand, the spaced-apart relationship of the applicator fingers with respect to the side wall of the forming chamber when the mould is in position of alignment with said wrapper-making device and, on the other hand, the application of said fingers against the side wall in all the other positions of the mould and during the displacement of said fingers along said side wall until they are concealed in the openings in the bottom wall.

2. The device of claim 1, wherein the control means comprise, for each applicator finger, a lever having at least two arms, the pivot axis of which is perpendicular to the plane of pivoting of said finger and mounted on a support sliding parallel to the axis of the forming chamber below the bottom wall of the forming chamber, one of said arms bearing at its free end the applicator finger and passing through the corresponding opening, a return spring mounted on said sliding support and acting on the other arm of the bent lever so as to urge the applicator finger against the side wall of the forming chamber as well as a spacer stop adapted to cooperate with one of the arms of the lever at the end of forward stroke of the sliding support so as to separate the corresponding applicator finger from the side wall of the forming chamber.

3. The device of claim 2, wherein a control washer is interposed between the return spring and each other arm of the bent levers for the applicator fingers.

4. The device of claim 2, wherein the sliding support is guided parallel to the axis of the forming chamber.

5. The device of claim 2, wherein the sliding support is guided on a guide rod coaxial to the axis of the forming chamber and fast with the lower face of the bottom wall of said forming chamber and comprises a guide bore through which said guide rod passes.

6. The device of claim 2, wherein the spacer stop adapted to cooperate with the other arm of the lever is constituted by a protuberant element in the bottom wall, said element projecting in the direction of the sliding support and comprising a stop face parallel to the bottom of the forming chamber.

7. The device of claim 2, wherein the sliding support is associated with a control bar which, in the two opposite directions of axial displacement of the sliding support, is fast therewith and is adapted to cooperate with actuation means provided outside the forming mould.

8. The device of claim 7, wherein the control bar is provided with a control stud or roller extending towards the outside of the mould and the actuation means comprise at least one guide ramp adapted to cooperate with said control stud or roller provided on the path of the mould between its position of stripping and its position of alignment with the wrapper-making device and comprising two guide sections, the first of which is associated with the outward path of said stud or roller, from the position of stripping to the position of alignment, and is of such shape that said stud, with the bar, sliding support and applicator fingers are moved from one extreme position to the other, i.e. from the first extreme position corresponding to the concealment of the applicator fingers in the bottom wall, to the position corresponding to the second extreme position for which the fingers penetrate most in the forming chamber and are closest to the opening of said chamber, and separated from the side wall of said chamber, and, the second section of which is associated with the return path, and is of such shape that said elements are moved from the second extreme position to a first intermediate position in which the fingers coming from the second extreme position abut against the side wall of the forming chamber, either directly or by means of a wrapper.

9. The device of claim 8, wherein the second section of the guide ramp is of such shape that, once the applicator fingers have returned from the second extreme position corresponding to their separation from the side wall of the forming chamber, into their position of application, said second ramp section ceases to cooperate with the control stud or roller.

10. The device of claim 7, wherein the actuation means comprise a return member arranged so as to be able to act on the control stud or roller, and to return said stud and thus the applicator fingers into the second extreme position corresponding to the concealment of said fingers in the bottom wall of the forming chamber.

11. The device of claim 10, wherein the return member is arranged so as to be able to act on the control stud or roller solely when the mould occupies the forming position.

12. The device of claim 10, wherein the return member is connected to the forming punch penetrating in the forming chamber, or to an element fast therewith.

13. The device of claim 8, associated with a mould which may pivot through 90° between a vertical position and a horizontal position and which is pivotally mounted on a press plate which is vertically movable between a position of forming and a position of stripping, wherein the guide ramp is mounted on the press plate.

14. The device of claim 2, wherein the lever is bent and its two arms define an obtuse angle therebetween.

15. The device of claim 2, wherein one of the arms of the lever is directed towards the axis of the forming chamber from its pivot axis.

16. The device of claim 2, wherein the arm of the lever which bears the applicator finger is fixed thereon in the zone of its outer radial end with respect to the axis of the forming chamber.

17. The device of claim 2, wherein the arm of the lever adapted to cooperate with the return spring, is offset laterally in the direction of the pivot axis of said lever.

18. The device of claim 2, wherein the bent lever comprises a third arm, the first arm being provided with said lever and being fast with the applicator finger, the second arm being directed outwardly and downwardly from the pivot axis and cooperating with the return spring acting as draw spring and fixed on the one hand to said second arm and to the sliding support and said third arm is designed as counter-stop adapted to cooperate with the spacer stop against the action of said return spring.

19. The device of claim 1, wherein the applicator fingers are provided opposite those portions of side wall of the forming chamber which comprise a small radius of curvature with respect to that of the other wall portions.

20. The device of claim 2, wherein the two arms of the lever are aligned with each other.

21. The device of claim 2, wherein the spacer stop comprises, for each lever, a cam which is disposed on the guide rod near the bottom wall of the forming chamber, in the same radial plane as the corresponding lever and which may provoke, at the end of the ascending stroke of the sliding support, the spaced-apart relationship of the corresponding applicator finger with respect to the side wall of the forming chamber.

22. The device of claim 10, wherein the return member is connected to the forming punch by means of a telescopic connection.